US010537901B2

(12) United States Patent
Lee

(10) Patent No.: US 10,537,901 B2
(45) Date of Patent: Jan. 21, 2020

(54) ELECTRIC DUST COLLECTING DEVICE AND AIR CONDITIONER INCLUDING THE SAME

(71) Applicant: LG ELECTRONICS INC., Seoul (KR)

(72) Inventor: Yanghwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 283 days.

(21) Appl. No.: 15/324,601

(22) PCT Filed: Jul. 7, 2015

(86) PCT No.: PCT/KR2015/006990
§ 371 (c)(1),
(2) Date: Jan. 6, 2017

(87) PCT Pub. No.: WO2016/006906
PCT Pub. Date: Jan. 14, 2016

(65) Prior Publication Data
US 2017/0203305 A1 Jul. 20, 2017

(30) Foreign Application Priority Data
Jul. 8, 2014 (KR) .................. 10-2014-0085435

(51) Int. Cl.
*B03C 3/12* (2006.01)
*F24F 3/16* (2006.01)
(Continued)

(52) U.S. Cl.
CPC ............... *B03C 3/12* (2013.01); *B03C 3/025* (2013.01); *B03C 3/08* (2013.01); *B03C 3/38* (2013.01);
(Continued)

(58) Field of Classification Search
CPC combination set(s) only.
See application file for complete search history.

(56) References Cited

U.S. PATENT DOCUMENTS 2,978,066 A * 4/1961 Nodolf .................. B03C 3/45
96/87
4,231,766 A * 11/1980 Spurgin .................. B03C 3/12
96/79

(Continued)

FOREIGN PATENT DOCUMENTS

CN 1113169 A 12/1995
JP 2006281135 A * 10/2006
(Continued)

*Primary Examiner* — Amber R Orlando
*Assistant Examiner* — Sonji Turner
(74) *Attorney, Agent, or Firm* — Dentons US LLP

(57) ABSTRACT

An electric dust collecting device according to the invention includes an electric charging unit for electrically charging dust in air, a first filter unit including a plurality of discharge electrode plates spaced apart from each other to define passages therebetween through which dust electrically charged by the electric charging unit passes, and a second filter unit disposed downstream of the plurality of discharge electrode plates in an air flow direction and connected to a ground to cause corona discharge between the plurality of discharge electrode plates and the second filter unit and to collect electrically charged dust. Dust particles electrically charged by the electric charging unit pass through the passages of the first filter unit and then are collected at the second filter unit, and dust particles electrically charged between the first filter unit and the second filter unit are electrically charged by the second filter unit, thus improving electric charging efficiency and dust collecting efficiency.

15 Claims, 13 Drawing Sheets

(51) Int. Cl.
  *B03C 3/41* (2006.01)
  *B03C 3/47* (2006.01)
  *B03C 3/08* (2006.01)
  *B03C 3/38* (2006.01)
  *B03C 3/02* (2006.01)
  *F24F 1/0076* (2019.01)
  *F24F 1/0007* (2019.01)

(52) U.S. Cl.
  CPC ............ *B03C 3/41* (2013.01); *B03C 3/47* (2013.01); *F24F 1/0076* (2019.02); *F24F 3/166* (2013.01); *B03C 2201/04* (2013.01); *F24F 1/0007* (2013.01)

(56) References Cited

U.S. PATENT DOCUMENTS

| | | | | |
|---|---|---|---|---|
| 4,643,745 A | * | 2/1987 | Sakakibara | B03C 3/12 96/76 |
| 4,673,416 A | * | 6/1987 | Sakakibara | B03C 3/12 96/79 |
| 5,055,118 A | * | 10/1991 | Nagoshi | B03C 3/08 96/77 |
| 5,466,279 A | * | 11/1995 | Hattori | B03C 3/12 29/25.01 |
| 5,547,496 A | * | 8/1996 | Hara | B03C 3/025 96/79 |
| 5,707,428 A | * | 1/1998 | Feldman | B03C 3/06 96/54 |
| 6,152,988 A | | 11/2000 | Plaks et al. | |
| 6,245,132 B1 | | 6/2001 | Feldman et al. | |
| 8,597,415 B2 | * | 12/2013 | Noh | B03C 3/12 96/60 |
| 8,617,298 B2 | * | 12/2013 | Nakahara | B03C 3/08 96/69 |
| 2003/0005824 A1 | * | 1/2003 | Katou | B03C 3/12 96/35 |
| 2004/0033176 A1 | | 2/2004 | Lee et al. | |
| 2009/0053113 A1 | | 2/2009 | Mai | |
| 2011/0094383 A1 | | 4/2011 | Noh et al. | |
| 2011/0139009 A1 | * | 6/2011 | Nakahara | B03C 3/08 96/95 |

FOREIGN PATENT DOCUMENTS

| | | |
|---|---|---|
| TW | 201208771 A1 | 3/2012 |
| WO | 2013/065497 A1 | 5/2013 |

\* cited by examiner

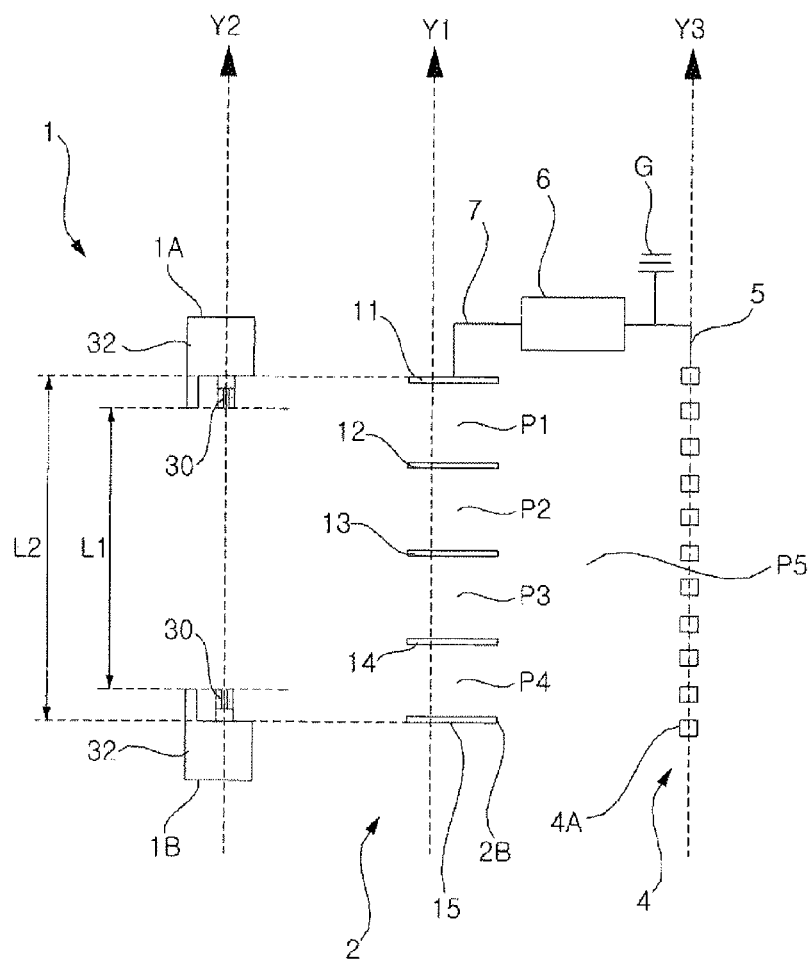
[Figure 1]

[Figure 2]
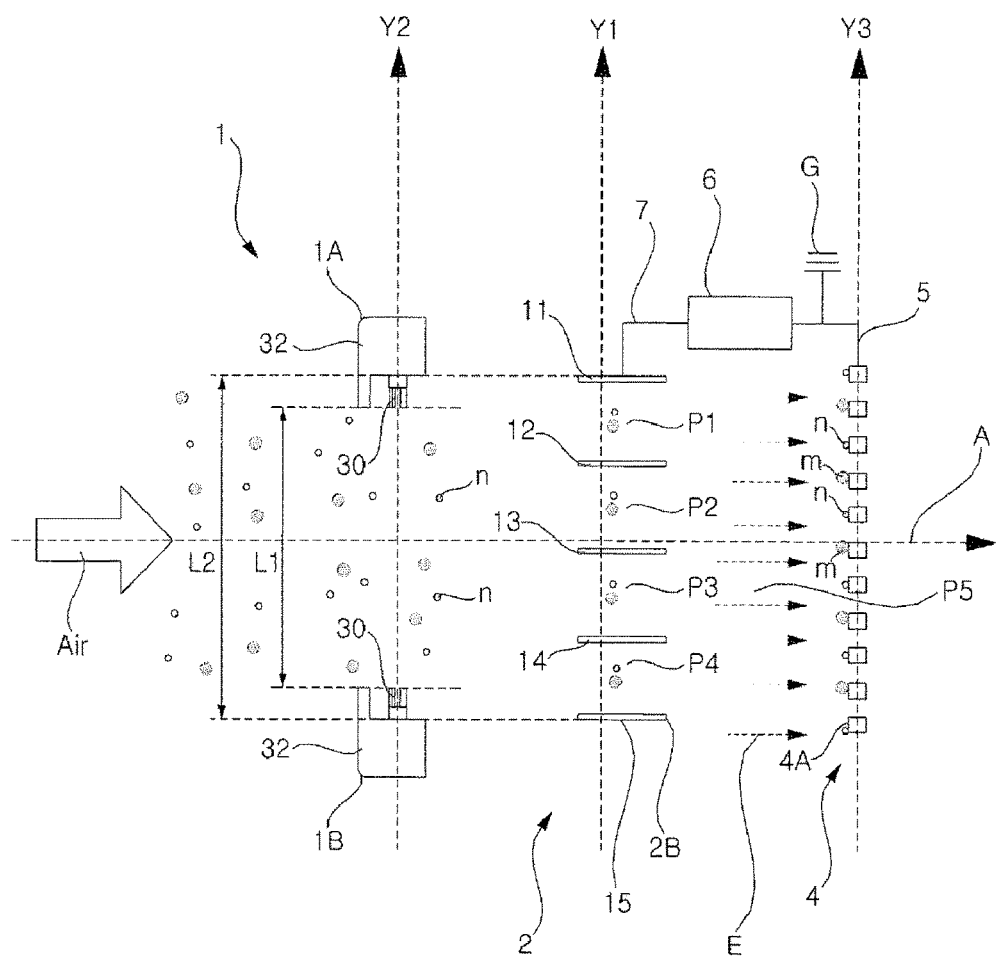

【Figure 3】
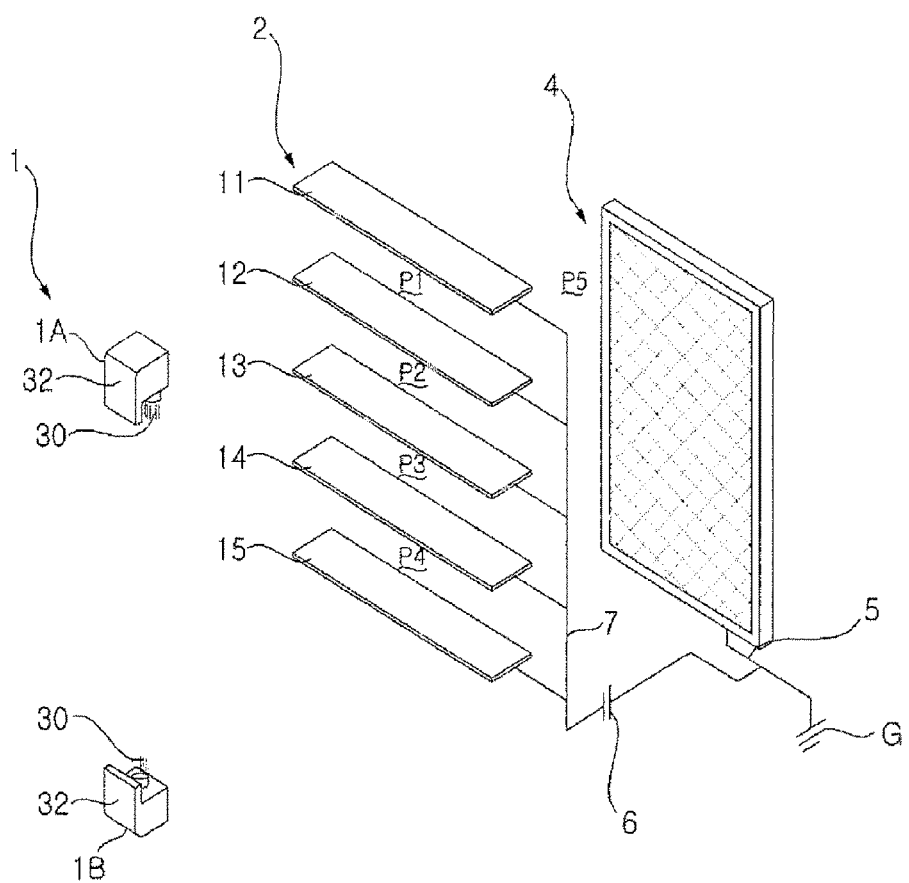

[Figure 4]
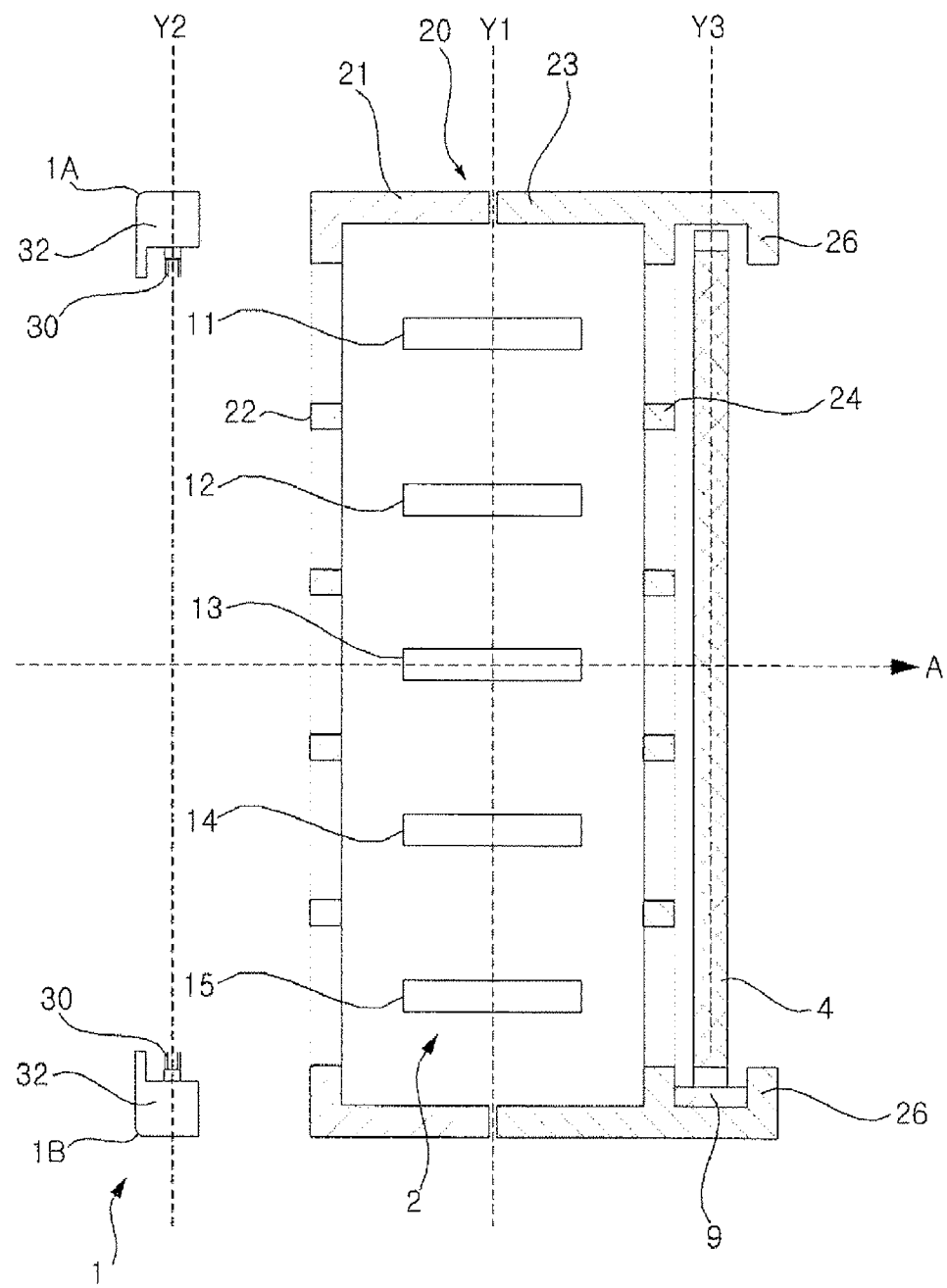

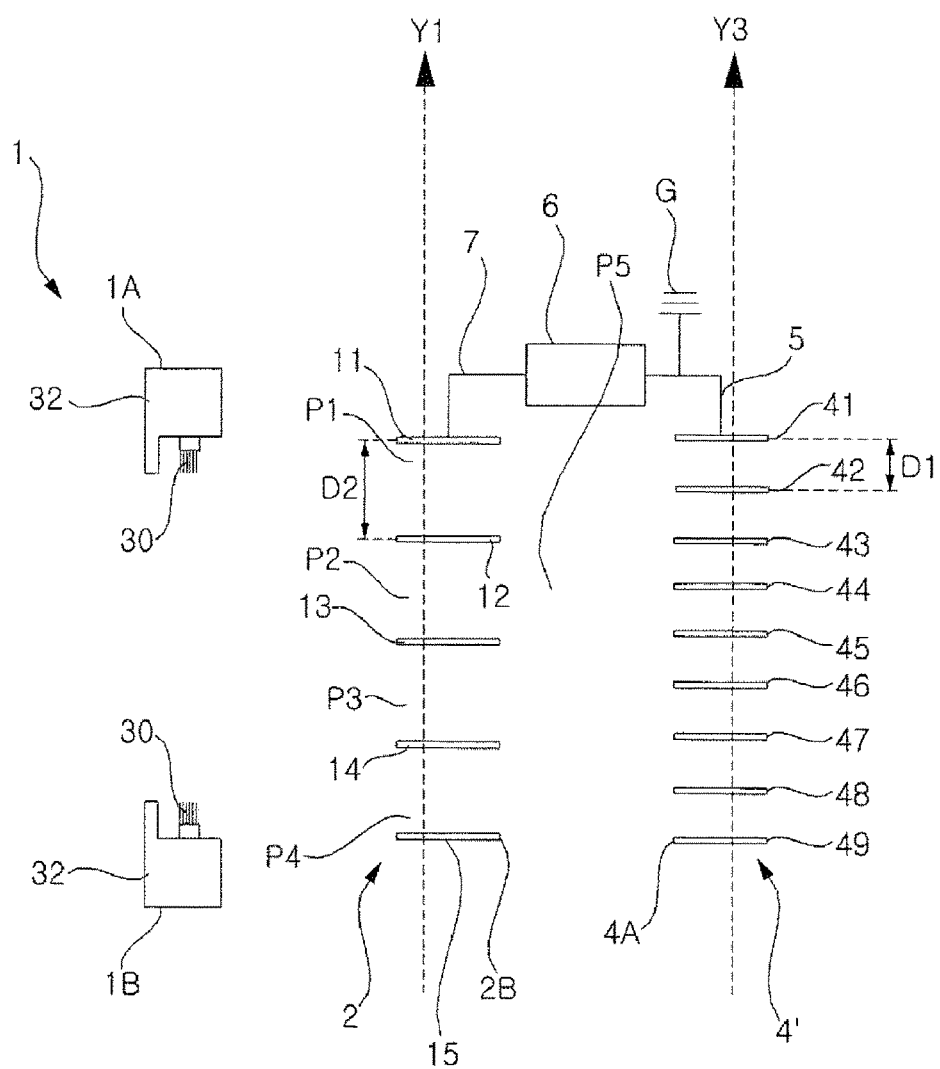
[Figure 5]

[Figure 6]
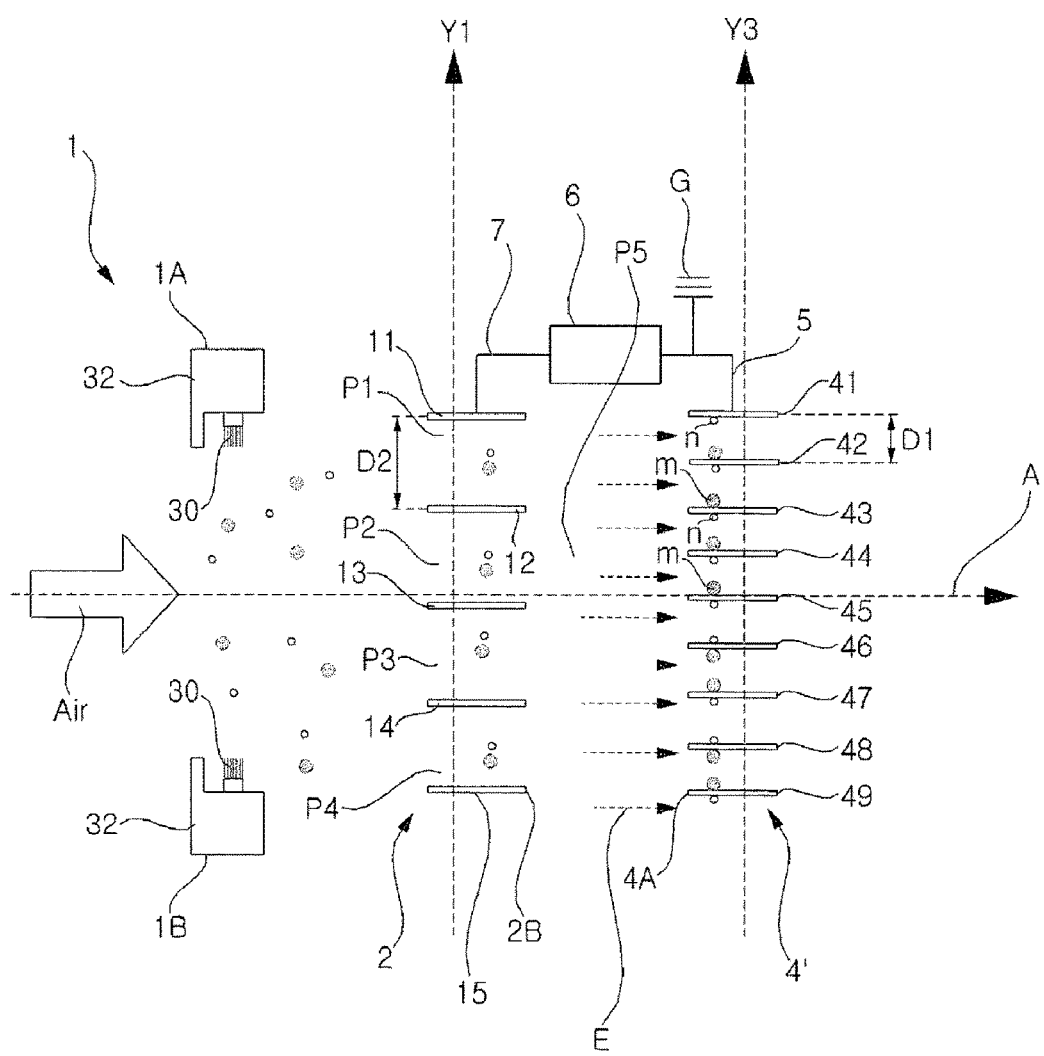

[Figure 7]
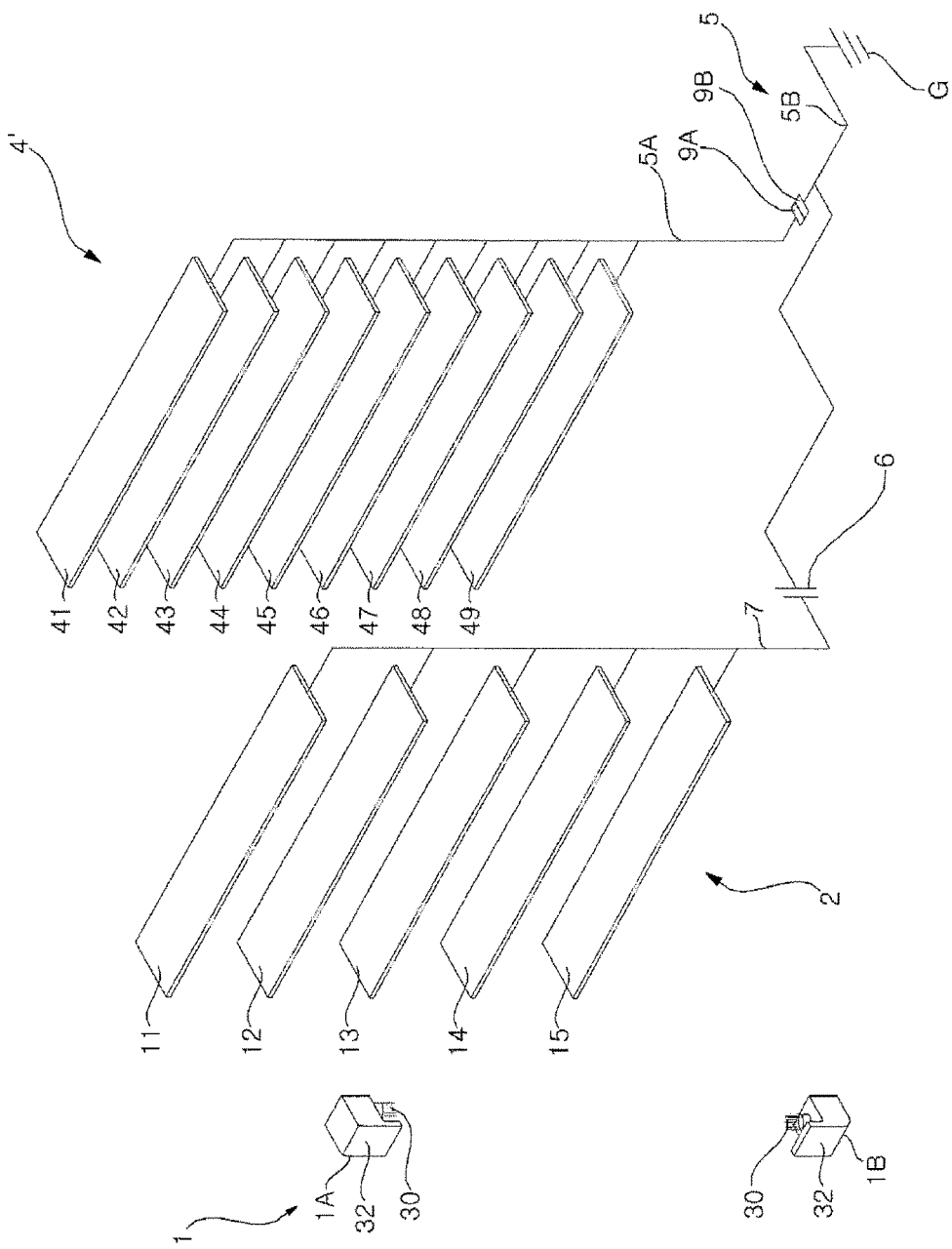

[Figure 8]
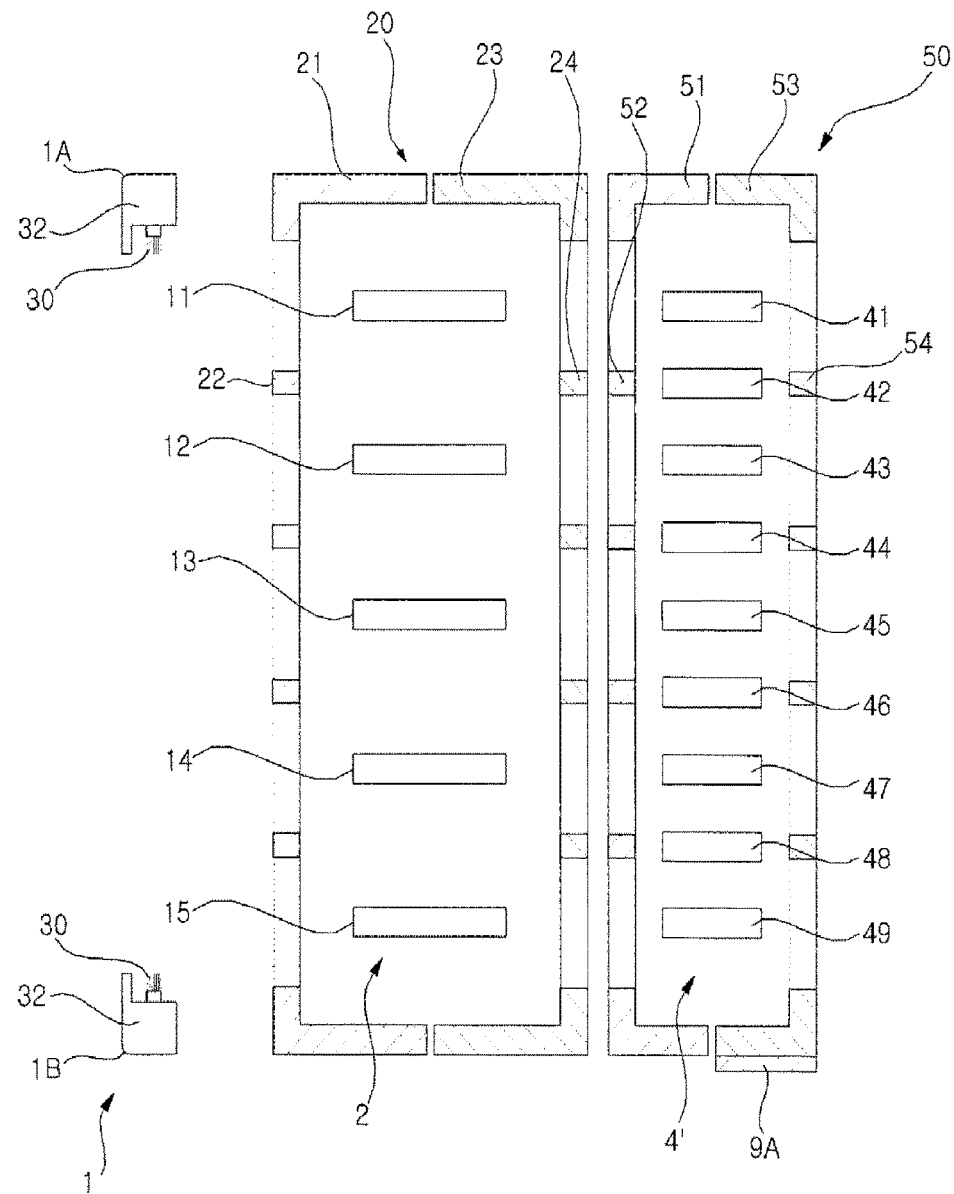

[Figure 9]
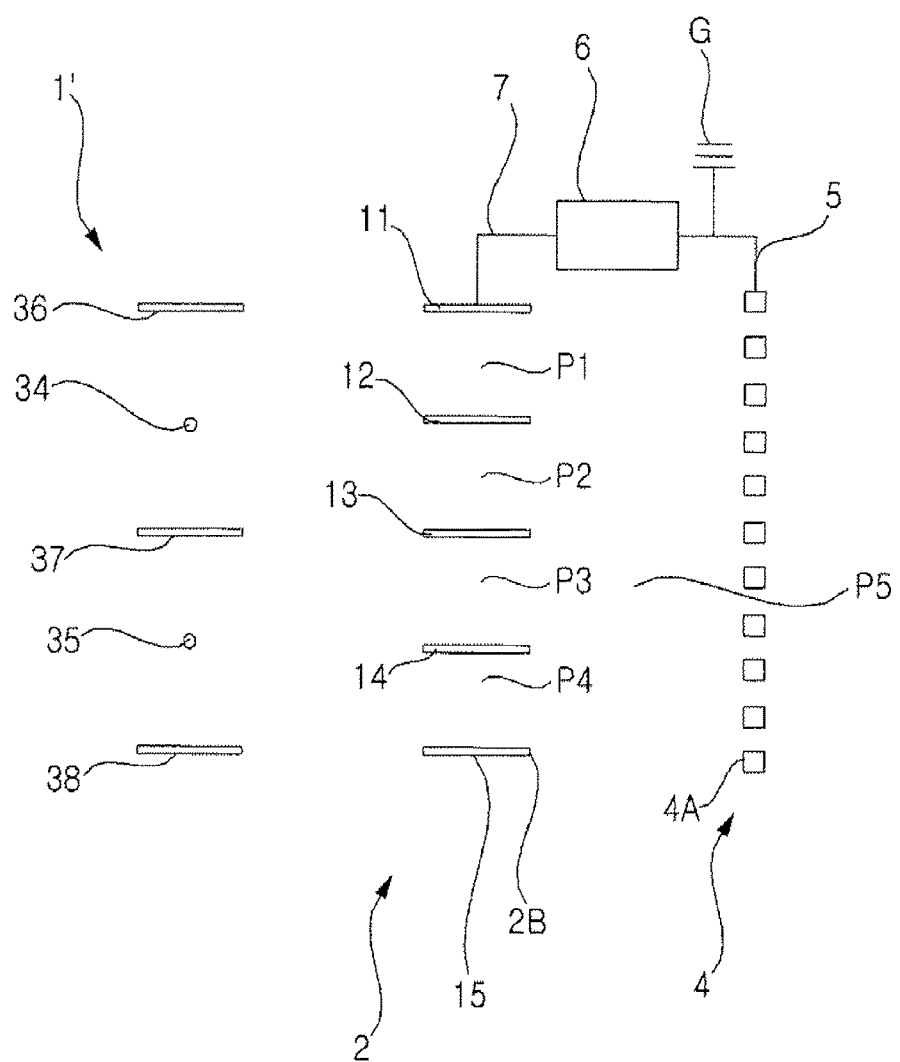

[Figure 10]
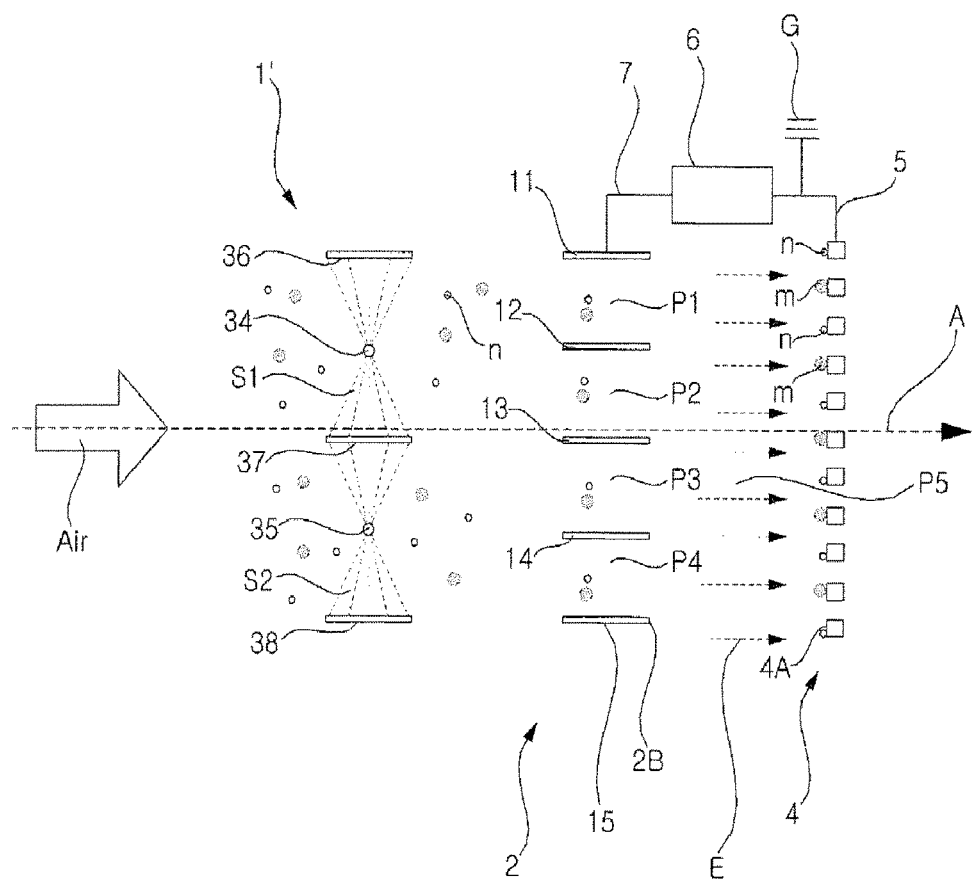

[Figure 11]
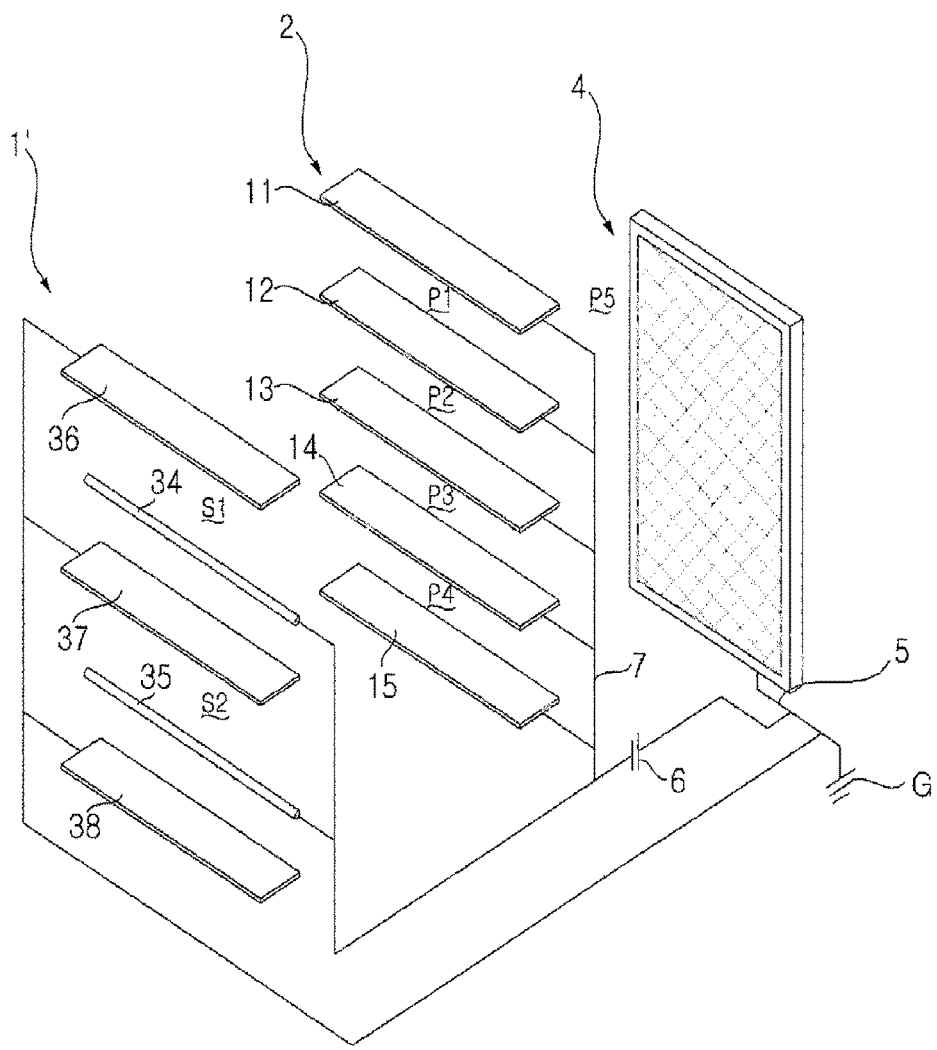

【Figure 12】
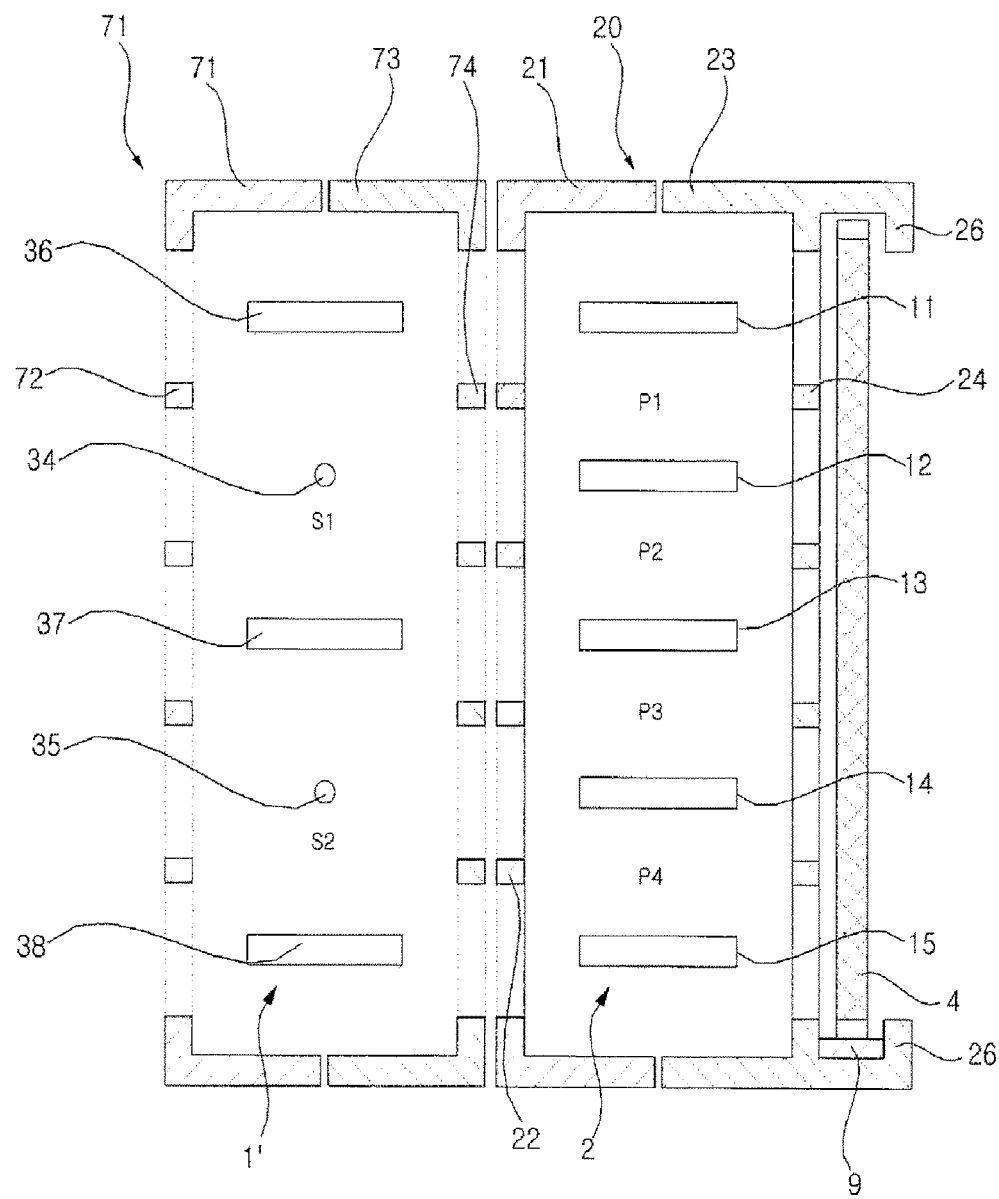

【Figure 13】
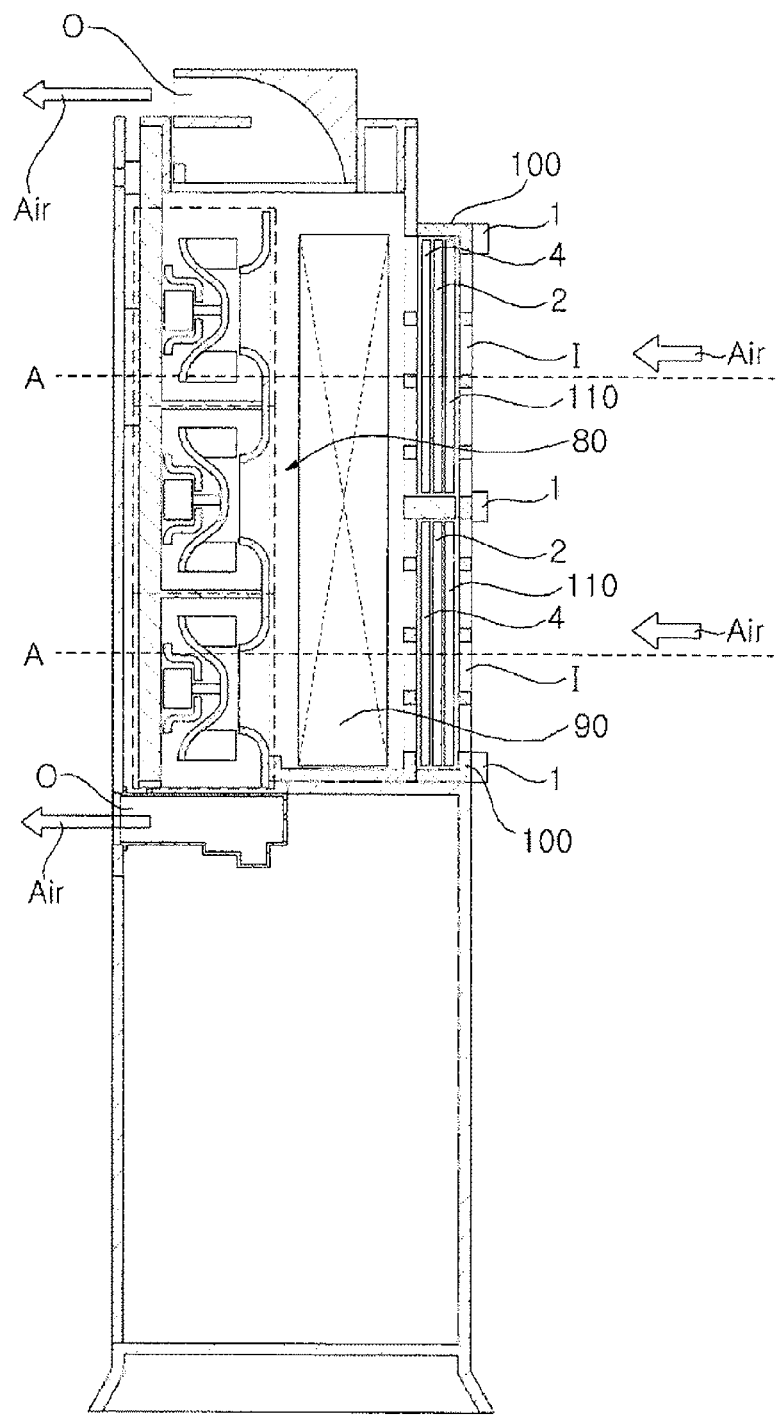

ELECTRIC DUST COLLECTING DEVICE AND AIR CONDITIONER INCLUDING THE SAME

This application is a National Stage Application of International Application No. PCT/KR2015/006990 filed on Jul. 7, 2015, which claims the benefit of Korean Patent Application No. 10-2014-0085435 filed on Jul. 8, 2014, all of which are hereby incorporated by reference in their entirety for all purposes as if fully set forth herein.

TECHNICAL FIELD

The present invention relates to an electric dust collecting device and an air conditioner including the same, and more particularly to an electric dust collecting device and an air conditioner including the same, in which dust particles in air are collected in a multistage manner.

BACKGROUND ART

In general, a typical electric dust collecting device is mounted in an air conditioner such as an air cleaner, a cooling apparatus and a heating apparatus to electrically charge and collect pollutants such as dust entrained in air.

The electric dust collecting device may include an electric charging unit for generating an electric field, and a dust collecting unit for collecting dust particles electrically charged by the electric charging unit. In use, after passing through the electric charging unit, dust entrained in air may be collected at the dust collecting unit while the air passes through the dust collecting unit.

The electric charging unit may include discharge electrodes, and counter electrodes disposed parallel to the discharge electrodes. Dust entrained in air may be collected by corona discharge occurring between the discharge electrodes and the counter electrodes which face each other.

With continuous use of the electric dust collecting device, pollutants may increasingly accumulate at the electric dust collecting unit. Accordingly, as servicing such as washing of the electric dust collecting unit is facilitated, convenience in use is improved.

RELATED ART DOCUMENT

Patent Document

Korean unexamined patent publication No. 10-2011-0045851 (Publication Date: May 4, 2011)

DISCLOSURE

Technical Problem

Since conventional electric dust collecting devices includes a dust collecting unit including both a high voltage electrode and a low voltage electrode, it is not easy to perform separation and washing operations of the dust collecting unit.

Therefore, the present invention has been made in view of the above problems, and it is an object of the present invention to provide an electric dust collecting device and an air conditioner including the same, which ensure easy servicing and improvement in electric charging efficiency and dust collecting efficiency.

Technical Solution

In accordance with an aspect of the present invention, the above and other objects can be accomplished by the provision of an electric dust collecting device including an electric charging unit for electrically charging dust in air, a first filter unit including a plurality of discharge electrode plates spaced apart from each other to define passages therebetween through which dust electrically charged by the electric charging unit passes, and a second filter unit disposed downstream of the plurality of discharge electrode plates in an air flow direction and connected to ground to cause corona discharge between the plurality of discharge electrode plates and the second filter unit and to collect electrically charged dust.

The plurality of discharge electrode plates may be disposed downstream of the electric charging unit in the air flow direction.

The plurality of discharge electrode plates may have rear ends disposed downstream in the air flow direction and facing the second filter unit.

The first filter unit may include passages defined between the plurality of discharge electrode plates.

The electric charging unit may include at least one ion generator for generating ions at a position before the plurality of discharge electrode plates in the air flow direction.

The at least one ion generator may include a pair of ion generators spaced apart from each other by a smaller spacing than that between the opposite outermost discharge electrode plates of the plurality of discharge electrode plates.

The at least one ion generator may be elongated in a direction parallel to a spacing direction of the plurality of electrode plates.

The electric charging unit may include a wire discharge electrode to which high voltage is applied, and a plurality of counter electrode plates spaced apart from the wire discharge electrode and connected to the ground, wherein the plurality of counter electrode plates may have front spaces therebetween facing the passages defined between the plurality of discharge electrode plates.

The second filter unit may be constituted by a metal mesh connected to the ground.

The second filter unit may include a plurality of earth electrode plates spaced apart from each other.

The plurality of earth electrode plates may have a smaller first spacing therebetween than a second spacing between the plurality of discharge electrode plates, and may include a larger number of earth electrode plates than that of the plurality of discharge electrode plates.

The electric dust collecting device may further include a first earth line connected to the second filter unit, a first earth terminal connected to the first earth line, a second earth line connected to the ground, and a second earth terminal connected to the second earth line and releasably connected to the first earth terminal.

In accordance with another aspect of the present invention, there is provided an air conditioner including an electric dust collecting device for electrically charging dust in air and collecting the charged dust, and a blower for blowing air toward the electric dust collecting device, wherein the electric dust collecting device includes an electric charging unit for electrically charging dust in air, a first filter unit including a plurality of discharge electrode plates spaced apart from each other to define passages therebetween through which dust electrically charged by the electric charging unit passes, and a second filter unit disposed downstream of the plurality of discharge electrode plates in an air flow direction and connected to a ground to cause corona discharge between the plurality of discharge electrode plates and the second filter unit and to collect electrically charged dust.

The plurality of discharge electrode plates may be disposed downstream of the electric charging unit in the air flow direction.

The electric charging unit may include at least one ion generator for generating ions at a position before the plurality of discharge electrode plates in the air flow direction.

The electric charging unit may include a wire discharge electrode to which high voltage is applied, and a plurality of counter electrode plates spaced apart from the wire discharge electrode and connected to ground, wherein the plurality of counter electrode plates may have front spaces therebetween facing the passages defined between the plurality of discharge electrode plates.

The second filter unit may be constituted by a metal mesh connected to the ground.

The second filter unit may include a plurality of earth electrode plates spaced apart from each other.

The plurality of earth electrode plates may have a smaller first spacing therebetween than a second spacing between the plurality of discharge electrode plates, and may include a larger number of earth electrode plates than that of the plurality of discharge electrode plates.

The air conditioner may further include a first earth line connected to the second filter unit, a first earth terminal connected to the first earth line, a second earth line connected to the ground, and a second earth terminal connected to the second earth line and releasably connected to the first earth terminal.

Advantageous Effects

According to the present invention, since dust particles electrically charged by the electric charging unit pass through the passages of the first filter unit and then are collected at the second filter unit, and dust particles electrically charged between the first filter unit and the second filter unit are electrically charged by the second filter unit, electric charging efficiency and dust collecting efficiency can be improved.

Furthermore, since the second filter unit includes the plurality of earth electrode plates but does not include a discharge electrode plates or a discharge wire, it is possible to separate and wash only the second filter unit without separating the electric charging unit and the first filter unit, thus improving convenience in servicing.

DESCRIPTION OF DRAWINGS

The above and other objects, features and other advantages of the present invention will be more clearly understood from the following detailed description taken in conjunction with the accompanying drawings, in which:

FIG. 1 is a view showing substantial components of a first embodiment of an electric dust collecting device according to the present invention;

FIG. 2 is a view showing the first embodiment of the electric dust collecting device according to the present invention which is collecting dust in operation;

FIG. 3 is a perspective view showing substantial components of the first embodiment of the electric dust collecting device according to the present invention;

FIG. 4 is a cross-sectional view showing the first embodiment of the electric dust collecting device according to the present invention;

FIG. 5 is a view showing substantial components of a second embodiment of an electric dust collecting device according to the present invention;

FIG. 6 is a view showing the second embodiment of the electric dust collecting device according to the present invention which is collecting dust in operation;

FIG. 7 is a perspective view showing substantial components of the second embodiment of the electric dust collecting device according to the present invention;

FIG. 8 is a cross-sectional view showing the second embodiment of the electric dust collecting device according to the present invention;

FIG. 9 is a view showing substantial components of a third embodiment of an electric dust collecting device according to the present invention;

FIG. 10 is a view showing the third embodiment of the electric dust collecting device according to the present invention which is collecting dust in operation;

FIG. 11 is a perspective view showing substantial components of the third embodiment of the electric dust collecting device according to the present invention;

FIG. 12 is a cross-sectional view showing the third embodiment of the electric dust collecting device according to the present invention; and FIG. 13 is a view showing an embodiment of an air conditioner having the electric dust collecting device according to the present invention.

BEST MODE

Hereinafter, embodiments of the present invention are described in detail with reference to the accompanying drawings.

FIG. 1 is a view showing substantial components of a first embodiment of an electric dust collecting device according to the present invention. FIG. 2 is a view showing the first embodiment of the electric dust collecting device according to the present invention which is collecting dust in operation. FIG. 3 is a perspective view showing substantial components of the first embodiment of the electric dust collecting device according to the present invention. FIG. 4 is a cross-sectional view showing the first embodiment of the electric dust collecting device according to the present invention.

The electric dust collecting device may include an electric charging unit 1 for electrically charging dust in air. The electric dust collecting device may include a first filter unit 2 including a plurality of discharge electrode plates 11 to 15 spaced apart from each other. The first filter unit 2 may have passages P1 to P4 defined between the plurality of discharge electrode plates 11 to 15 so as to allow dust particles electrically charged by the electric charging unit 1 to pass through the passages P1 to P4.

The electric dust collecting device includes a second filter unit 4 disposed downstream of the plurality of discharge electrode plates 11 to 15a in an air flow direction A. The second filter unit 4 may be connected to the ground G to cause corona discharge between the discharge electrode plates 11 to 15 and the second filter unit 4. When high voltage is applied to the plurality of discharge electrode plates 11 to 15, an electric field may be formed between the plurality of discharge electrode plates 11 to 15 and the second filter unit 4, and thus corona discharge may be caused in a space between the first filter unit 2 and the second filter unit 4.

The electric dust collecting device may electrically charge and collect dust in air in a multistage manner. The first filter unit 2 and the second filter unit 4 may constitute an additional electric charging unit independently from the electric charging unit 1. When the electric charging unit 1 is a first electric charging unit, the first filter unit 2 and the second filter unit 4 may constitute a second electric charging unit. The electric charging unit 1 may be the first electric charging unit disposed upstream of the electric dust collecting device in an air flow direction A, and the first filter unit 2 and the second filter unit 4 may be the second electric charging unit disposed downstream of the electric dust collecting device in the air flow direction A.

Dust particles, which have been electrically charged by positive ions and negative ions generated from the electric charging unit 1, may be collected at the second filter unit 4. Dust particles n, which have been electrically charged by positive ions and negative ions generated from the electric charging unit 1, may pass through passages P1 to P4 defined between the plurality of discharge electrode plates 11 to 15 and may flow to the second filter unit 4. The dust particles n may be collected at the second filter unit 4 connected to the ground G.

Furthermore, dust particles m, which have been electrically charged by corona discharge caused between the plurality of discharge electrode plates 11 to 15 and the second filter unit 4, may be collected at the second filter unit 4. The dust particles m, which have been electrically charged by corona discharge caused between the plurality of discharge electrode plates 11 to 15 and the second filter unit 4, may be collected at the second filter unit 4 connected to the ground G.

In other words, the second filter unit 4 may collect the dust particles n, which have been electrically charged by the electric charging unit 1 and then have passed through the passages P1 to P4, and the dust particles m, which have been electrically charged by corona discharge between the plurality of discharge electrode plates 11 to 15 and the second filter unit 4.

The dust particles m and n in air may be first electrically charged by the electric charging unit 1 and may be subsequently electrically charged by the first filter unit 2 and the second filter unit 4. The dust particles m and n, which have been electrically charged in a multistage manner, may be collected at the second filter unit 4.

The electric dust collecting device including the electric charging unit 1, the first filter unit 2 and the second filter unit 4 enables a larger amount of dust particles to be efficiently collected at the second filter unit 4, compared to the case of including the electric charging unit 1 and the second filter unit 4 but excluding the first filter unit 2.

The electric dust collecting device including the electric charging unit 1, the first filter unit 2 and the second filter unit 4 enables a larger amount of dust particles to be efficiently collected at the second filter unit 4, compared to the case of including the first filter unit 2 and the second filter unit 4 but excluding the electric charging unit 1.

The electric dust collecting device may improve charging rate for dust particles m and n by virtue of diffusive electric charging by the electric charging unit 1 and electric charging by the first filter unit 2 and the second filter unit 4, and may collect a larger amount of dust particles m and n by the second filter unit 4.

Hereinafter, the electric charging unit 1, the first filter unit 2 and the second filter unit 4 will be described in more detail.

The electric charging unit 1 may include at least one ion generator 1 which is adapted to emit ions toward the plurality of discharge electrode plates 11 to 15 in the air flow direction A. In the following description, the electric charging unit 1 and the ion generator are designated by the same numeral in this embodiment.

The ion generator 1 may be positioned before the plurality of discharge electrode plates 11 to 15 in the air flow direction A, and may emit ions to the space before the plurality of discharge electrode plates 11 to 15 in the air flow direction A to electrically charge the dust particles n by diffusive electric charging. The ion generator 1 may have a smaller size than the overall size of the first filter unit 2. The ion generator 1 may include carbon fiber electrodes 30 for causing corona discharge, and may maximize an amount of generated ions. The carbon fiber electrodes 30 may be configured into a brush shape. The carbon fiber electrodes 30 may be positioned before the first filter unit 2 in the air flow direction A. Upon application of high voltage, the carbon fiber electrodes 30 may be electrically discharged to ionize molecules in air and may generate negative ions such as OH− and O− or positive ions such as H+. Each carbon fiber electrodes 30 is preferably constituted by a plurality of ultrafine carbon fibers tied into a bundle. The carbon fiber electrodes 30 may be longitudinally disposed in the direction perpendicular to the air flow direction A. Ions generated from the carbon fiber electrodes 30 electrically charge pollutants in air. Negative ions may provide electrons to the pollutants and thus electrically charge the pollutants into negative polarity. Positive ions may take electrons from the pollutants and thus electrically charge the pollutants into positive polarity. The ion generator 1 may extend in a direction Y2 parallel to a spacing direction Y1 of the plurality of discharge electrode plates 11 to 15.

The ion generator 1 may ionize molecules in air by high voltage generated from a high voltage generator 6 (described later) to generate ions. The ion generator 1 may ionize molecules in air by discharging at the carbon fiber electrodes 30, and the resulting ions may electrically charge dust particles n in air. The ion generator 1 may further include an electrode housing 32 for protecting the carbon fiber electrodes 30. The ion generator 1 may be mounted at the electrode housing 32 on an air conditioner. The electrode housing 32 may be provided with a PCB (not shown) connected to the carbon fiber electrodes 30. The carbon fiber electrodes 30 may be connected to the PCB via an additional wire, or may be directly connected to the PCB. The carbon fiber electrode 30, the electrode housing 32 and the PCB may constitute an ion generation module.

The ion generator 1 may be installed at an inflow body (not shown) through which air passes in the course of entering an air conditioner. The ion generator 1 may be mounted at the electrode housing 32 on the inflow body.

The ion generator 1 may include a pair of ion generators 1A and 1B. The pair of ion generators 1A and 1B may be spaced apart from each other by a predetermined spacing. The pair of ion generators 1A and 1B may be spaced apart from each other in the direction Y2 parallel to the spacing direction Y1 of the plurality of discharge electrode plates 11 to 15. When the pair of ion generators 1A and 1B are installed at an air conditioner, the pair of ion generators 1A and 1B may be spaced apart from each other by a smaller spacing L1 than a distance L2 between the outmost discharge electrode plates 11 and 15 of the plurality of discharge electrode plates 11 to 15.

The plurality of discharge electrode plates 11 to 15 may be positioned downstream of the electric charging unit 1 in the air flow direction A. The plurality of discharge electrode plates 11 to 15 may be spaced apart from each other in the direction perpendicular to the air flow direction A. The plurality of discharge electrode plates 11 to 15 may be horizontally disposed, or may be disposed in parallel. The plurality of discharge electrode plates 11 to 15 may be disposed such that rear ends 2B of the discharge electrode plates 11 to 15 face the second filter unit 4. The first filter unit 2 may be constructed such that the passages P1 to P4 are defined between the plurality of discharge electrode plates 11 to 15. The passages P1 to P4 may serves as flow channels through which dust particles electrically charged by the electric charging unit 1 flow. The passages P1 to P4 of the first filter unit 2 may serve as dispersion channels for dispersing air. The first filter unit 2 may not have additional counter electrodes (earth electrodes) between the plurality of discharge electrode plates 11 to 15. In this case, the first filter unit 2 may include more discharge electrode plates 11 to 15 than the case of including additional counter electrodes (earth electrodes) between the plurality of discharge electrode plates 11 to 15.

When the entire first filter unit 2 occupies the same space, the first filter unit 2 may be provided with only the plurality of discharge electrode plates 11 to 15 without additional counter electrodes (earth electrodes). In this case, the first filter unit 2 may accommodate more discharge electrode plates 11 to 15 than the case in which the discharge electrode plates 11, 13 and 15 and the counter electrodes (earth electrodes) are alternately installed. Since the plurality of discharge electrode plates 11 to 15 do not include counter electrodes disposed therebetween, the plurality of discharge electrode plates 11 to 15 may face each other.

All of the discharge electrode plates 11 to 15 may be electrically connected to the high voltage generator 6. The first filter unit 2 may include the plurality of discharge electrode plates 11 to 15 to which high voltage is applied.

As shown in FIG. 4, the electric dust collecting device 1 may include a first filter case 20 at which the plurality of discharge electrode plates 11 to 15 are disposed. The plurality of discharge electrode plates 11 to 15 may be disposed in the first filter case 20, and the first filter case 20 may protect the plurality of discharge electrode plates 11 to 15. In other words, the first filter case 20 may be a discharge electrode plate case for protecting the plurality of discharge electrode plates 11 to 15.

The first filter case 20 may include at least one case member. The case member of the first filter case 20 may include a first inflow case member 21 through which air passes. The first inflow case member 21 may be provided with an air inflow port through which air passes, and the air inflow port may be provided with an inflow grille 22. Air may pass through the inflow grilles 22 of the inflow case 21 and then flow toward the plurality of discharge electrode plates 11 to 15. The case member of the first filter case 20 may further include a first outflow case member 23 through which air having passed through the plurality of discharge electrode plates 11 to 15 is discharged. The first outflow case member 23 may be provided with an air outflow port, and the air outflow port may be provided with an outflow grille 24. Air may pass through spaces between the plurality of discharge electrodes 11 to 15, and then may be discharged from the first outflow case member 23 through the outflow grille 24 of the first outflow case member 23. The first filter unit 4 may constitute a discharge electrode plate module which does not include a counter electrode (earth electrode).

The second filter unit 4 may be positioned downstream of the first filter unit 2 in the air flow direction A. The second filter unit 4 may be connected to the ground G to cause corona discharge between the plurality of discharge electrode plates 11 to 15 and the second filter unit 4. The second filter unit 4 may be connected to the ground G to collect dust particles m and n which have been electrically charged by corona discharge. When high voltage is applied to the plurality of discharge electrode plates 11 to 15 from the high voltage generator 6, corona discharge may occur between the respective discharge electrode plates 11 to 15 and the second filter unit 4, and thus dust particles m in air may be electrically charged by the corona discharge. The dust particles m, which have been electrically charged, adhere to the second filter unit 4 connected to the ground G. The second filter unit 4 may be an earth filter that does not include a discharge electrode plate.

A front end 4A of the second filter unit 4 may be spaced apart from a rear end 2B of the first filter unit 2 in the air flow direction A.

The second filter unit 4 may extend in a direction Y3 parallel to the spacing direction Y1 of the plurality of discharge electrode plates 11 to 15.

The second filter unit 4 may be constituted by a metal mesh. The second filter unit 4 may be detachably connected to an earth line 5. The electric dust collecting device may be constructed such that pollutants are collected only at the second filter 4 but not the first filter unit 2. Accordingly, a user may dismantle only the second filter unit 4 for washing or servicing thereof.

When the second filter unit 4 is constituted by a metal mesh, the second filter unit 4 may be installed spaced apart from the first filter case 20 of the first filter unit 2, and may be mounted on the first filter case 20 of the first filter unit 2.

The first filter case 20 may be provided with a second filter unit attachment 26 to which the second filter unit 4 is attached. In this case, the earth line 5 may be connected to the first filter case 20. When the first filter case 20 includes both the first inflow case member 21 and the first outflow case member 23, the second filter unit attachment 26 may be formed at the first outflow case member 23. The earth line 5 may be connected to the first outflow case member 23. The second filter unit attachment 26 may be constituted by a slide guide formed at the first outflow case member 23 so as to allow the second filter 4 to be slidably attached/detached to/from the first outflow case member 23. The second filter unit attachment 26 may also be constituted by a hook formed at the first outflow case member 23 so as to allow the second filter 4 to be resiliently coupled to the first outflow case member 23. The second filter unit 4 may be connected to the earth line 5 when completely attached to the second filter unit attachment 26, and may be separated from the earth line 5 when dismantled from the second filter unit attachment 26. The earth line 5 may be connected to an earth terminal 9 which may contact the second filter unit 4. The earth terminal 9 may be constituted by a planar structure capable of contacting the second filter unit 4 in a surface contact manner upon attachment of the second filter unit 4.

The high voltage generator 6 may be electrically connected to all of the discharge electrode plates 11 to 15 to apply high voltage to all of the discharge electrode plates 11 to 15. The high voltage generator 6 may be connected to the plurality of discharge electrode plates 11 to 15 through a high voltage line 7. The high voltage line 7 may always contact the plurality of discharge electrode plates 11 to 15.

The single high voltage generator 6 may apply high voltage to both the ion generator 1 and the first filter unit 2. The electric dust collecting device may also include both a first high voltage generator for applying high voltage to the ion generator 1 and a second high voltage generator for applying high voltage to the first filter unit 2.

Operation of this embodiment is now described.

When the second filter unit 4 is attached to the second filter unit attachment 26, the second filter unit 4 may be connected to the earth line 5. When the high voltage generator 6 is activated with the second filter unit 4 grounded, the high voltage generator 6 may apply high voltage to all of the plurality of discharge electrode plates 11 to 15 of the first filter unit 2.

The high voltage generator 6 may apply high voltage to the ion generator 1. When high voltage is applied to the ion generator 1, the ion generator 1 may generate positive ions or negative ions by diffusive charging, and the positive ions or the negative ions generated from the ion generator 1 may spread in all directions.

When high voltage is applied to all of the plurality of discharge electrode plates 11 to 15, corona discharge may occur at a space P5 between all of the plurality of discharge electrode plates 11 to 15 and the second filter unit 4.

Air may pass through a space positioned before the first filter unit 2 in the air flow direction A. At this time, duct particles in air may be electrically charged by positive ions or negative ions generated from the ion generator 1. Dust particles in air may flow toward the first filter unit 2, and then may pass through the plurality of passages P1 to P4 defined between the plurality of discharge electrode plates 11 to 15. The dust particles in air may be electrically charged by corona discharge caused at the space P5 between the plurality of discharge electrode plates 11 to 15 and the second filter unit 4.

Dust particles n which are electrically charged by the ion generator 1 and dust particles m which are electrically charged at the space P5 between the plurality of discharge electrode plates 11 to 15 and the second filter unit 4 may flow toward the second filter unit 4, and then may adhere to the second filter unit 4 connected to ground, thus achieving dust collection at the second filter unit 4.

Dust particles may include dust particles m having a relatively larger size and dust particles having a relatively smaller size which are mixed with each other in air. Among the dust particles m and n, the smaller dust particles n may be electrically charged by the ion generator 1 and then collected at the second filter unit 4. The larger dust particles m may be electrically charged by corona discharge in the space P5 between the plurality of discharge electrode plates 11 to 15 and the second filter unit 4 and then collected at the second filter unit 4. In other words, the electric dust collecting device may more efficiently collect dust particles m and n having various sizes at the second filter unit 4.

FIG. 5 is a view showing substantial components of a second embodiment of an electric dust collecting device according to the present invention. FIG. 6 is a view showing the second embodiment of the electric dust collecting device according to the present invention which is collecting dust in operation. FIG. 7 is a perspective view showing substantial components of the second embodiment of the electric dust collecting device according to the present invention. FIG. 8 is a cross-sectional view showing the second embodiment of the electric dust collecting device according to the present invention.

A second filter unit 4' of the second embodiment may include a plurality of earth electrode plates 41 to 49 which are spaced apart from each other. Since the construction and operations of component other than the second filter unit 4' are identical or similar to those of the first embodiment, the same reference numbers will be used throughout the drawings, and redundant descriptions thereof are omitted.

The second filter unit 4' may be positioned downstream of the first filter unit 2 in an air flow direction A, and a front end 4A of the second filter unit 4' may be spaced apart from a rear end 2B of the first filter unit 2 in the air flow direction A.

The second filter unit 4' may have spaces defined between the plurality of earth electrode plates 41 to 49. The plurality of earth electrode plates 41 to 49 may be positioned parallel to each other. A lower surface of one of the plurality of earth electrode plates 41 to 49 may face an upper surface of another adjacent earth electrode plate disposed below the one earth electrode plate. The plurality of earth electrode plates 41 to 49 may be positioned parallel to the air flow direction A. A first spacing D1 between two adjacent ones of the plurality of earth electrode plates 41 to 49 may be smaller than a second spacing D2 between two adjacent ones of the plurality of discharge electrode plates 11 to 15.

The number of the plurality of earth electrode plates 41 to 49 may be greater than number of the plurality of discharge electrode plates 11 to 15.

The second filter unit 4' may include one or more earth electrode plates 42, 44, 46 and 48 which have front ends directed toward the spaces S1 to S4 defined in the first filter unit 2 in the air flow direction A.

The plurality of earth electrode plates 41 to 49 may be disposed parallel to the plurality of discharge electrode plates 11 to 15 in the air flow direction A. The plurality of discharge electrode plates 11 to 15 may be disposed parallel to the air flow direction A, and the plurality of earth electrode plates 41 to 49 may also be disposed parallel to the air flow direction A. The plurality of earth electrode plates 41 to 49 may be spaced apart from each other in the direction Y3 perpendicular to the air flow direction A in the same fashion as the plurality of discharge electrode plates 11 to 15.

The plurality of earth electrode plates 41 to 49 may be spaced apart from each other in the direction Y3 parallel to the spacing direction along which the plurality of discharge electrode plates 11 to 15 are spaced apart from each other.

The electric dust collecting device may include a second filter case 50 in which the plurality of earth electrode plates 41 to 49 are installed. The plurality of earth electrode plates 41 to 49 may be installed in the second filter case 50. The second filter case 50 may protect the plurality of earth electrode plates 41 to 49. The second filter case 50 may serve as an earth electrode plate case for protecting the plurality of earth electrode plates 41 to 49.

The second filter case 50 may include one or more case members. The case members 51 and 53 of the second filter case 50 may include a second inflow case member 51 at which an air inflow port is formed so as to allow air to pass therethrough. The air inflow port may be provided with an inflow grille 52. Air may pass through the inflow grille 52 of the second inflow case member 51 and then may flow toward the plurality of earth electrode plates 41 to 49. The case members 51 and 53 of the second filter case 50 may further include a second outflow case member 53 through which the air having passed the plurality of earth electrode plates 41 to 49 is discharged. The second outflow case member 53 may be provided with an air outflow port through which air passes, and the air outflow port may be provided with an outflow grille 54. Air may pass through the plurality of earth electrode plates 41 to 49 and then may be discharged from the second filter case 50 through the outflow grille 54 of the second outflow case member 53.

The second filter unit 4' may be configured to be detachably coupled to the ground G. The electric dust collecting device may be constructed such that only the second filter unit 4' among the first filter unit 2 and the second filter unit 4' may collect pollutants and thus a worker such as a user may separate only the second filter unit 4' for washing or servicing thereof. The second filter unit 4' may be connected to a first earth line 5A. The first earth line 5A may be connected to all of the plurality of earth electrode plates 41? 49. The electric dust collecting device may further include a second earth line 5B connected to the ground G. The first earth line 5A and the second earth line 5B may be connected to each other and separated from each other. The first earth line 5A may be installed at the second filter case 50. The second earth line 5B may be disposed outside the second filter case 50.

The second filter case 50 may be detachably mounted on the first filter case 20, or may be detachably mounted on a filter guide (not shown and described later) other than the first filter case 20.

When the second filter case 50 is detachably mounted on the first outflow case member 23, the first outflow case member 23 may be provided with the second filter case attachment (not shown) on which the second filter case 50 is mounted. In this case, the second earth line 5B may be coupled to the second filter case attachment. The second filter case attachment may be constituted by a sliding guide formed at the first outflow case member 23 such that the second filter case 50 may be detachably mounted on the first outflow case member 23 in a sliding manner. The second filter case attachment may be constituted by hooks formed at the first outflow case member 23 such that the second filter case 50 is resiliently coupled to the first outflow case member 23. The first earth line 5A and the second earth line 5B may be connected to each other when the second filter case 50 is mounted on the second filter unit attachment, and may be disconnected from each other when the second filter case 50 is separated from the second filter unit attachment. The second earth line 5B may be connected to the first earth terminal 9A, and the second earth line 5B may be connected to the second earth terminal 9B which contacts the first earth terminal 9A and is disconnected from the first earth terminal 9A.

Operation of the second embodiment will now described.

The electric dust collecting device according to the second embodiment is also operated as in the first embodiment. Specifically, upon activation of the high voltage generator 6, dust particles in air may be electrically charged in a diffusive manner by the ion generator 1, and may be electrically charged by corona discharge between the plurality of discharge electrode plates 11 to 15 and the plurality of earth electrode plates 41 to 49. Dust particles m which are electrically charged in a diffusive manner by the ion generator 1 and dust particles n which are electrically charged in the space D5 between the first filter unit 2 and the second filter unit 4' may be dispersed to the plurality of earth electrode plates 41 to 49 connected to the ground G and may be collected thereat.

FIG. 9 is a view showing substantial components of a third embodiment of an electric dust collecting device according to the present invention. FIG. 10 is a view showing the third embodiment of the electric dust collecting device according to the present invention which is collecting dust in operation. FIG. 11 is a perspective view showing substantial components of the third embodiment of the electric dust collecting device according to the present invention. FIG. 12 is a cross-sectional view showing the third embodiment of the electric dust collecting device according to the present invention.

An electric charging unit 1' of the third embodiment may include wire discharge electrodes 34 and 35 to which high voltage is applied, and a plurality of counter electrode plates 36, 37 and 38 spaced apart from the wire discharge electrodes 34 and 35. Since the construction and operation of components other than the electric charging unit 1' are identical or similar to those of one of the first and second embodiments, redundant descriptions thereof are omitted.

Disposed between the plurality of counter electrode plates 36, 37 and 38 may be front spaces S1 and S2 which face the passages P1 to P4 defined between the plurality of discharge electrode plates 11, 12, 13, 14 and 15.

The electric dust collecting device of the third embodiment may include the discharge electrodes 34 and 35, and a third filter case 70 at which the plurality of counter electrode plates 36, 37 and 38 are installed. The wire discharge electrodes 34 and 35 and the counter electrode plates 36, 37 and 38 may be installed in the third filter case 70. The third filter case 70 may protect the wire discharge electrodes 34 and 35, and the plurality of counter electrode plates 36, 37 and 38. The third filter case 70 may serve as an electric charging case for protecting the wire discharge electrodes 34 and 35, and the plurality of counter electrode plates 36, 37 and 38.

The third filter case 70 may include one or more case members. The case members of the third filter case 70 may include a third inflow case member 71 at which an air inflow port is formed so as to allow air to pass therethrough. The air inflow port may be provided with an inflow grille 72. Air may pass through the inflow grille 72 of the third inflow case member 71 and then may flow toward spaces between the plurality of counter electrode plates 36, 37 and 38. The case members of the third filter case 70 may further include a third outflow case member 73 through which the air having passed through spaces between the plurality of counter electrode plates 36, 37 and 38 is discharged. The third outflow case member 73 may be provided with an air outflow port through which air passes, and the air outflow port may be provided with an outflow grille 74. Air may be electrically charged by corona discharge between the wire discharge electrodes 34 and 35 and the counter electrode plates 36, 37 and 38 while passing through spaces between the plurality of counter electrode plates 36, 37 and 38. Subsequently, the air may be discharged from the third filter case 70 through the outflow grille 74 of the third outflow case member 73.

The electric charging unit 1' may be connected to the high voltage generator 6. The electric charging unit 1' may be constructed such that the wire discharge electrodes 34 and 35 are electrically connected to the high voltage generator 6 and the plurality of counter electrode plates 36, 37 and 38 are connected to the ground G.

The single high voltage generator 6 may apply high voltage both the wire discharge electrodes 34 and 35 of the electric charging unit 1' and the plurality of counter electrode plates 11 to 15 of the first filter unit 2. The electric dust collecting device may also include both a first high voltage generator for applying high voltage to the wire discharge electrodes 34 and 35 of the electric charging unit 1' and a second high voltage generator for applying high voltage to discharge electrode plates 11 to 15 of the first filter unit 2.

Operation of the third embodiment will now described.

Upon activation of the electric dust collecting device of the third embodiment, corona discharge may occur between the wire discharge electrodes 34 and 35 and the counter electrode plates 36, 37 and 38 of the electric charging unit 1'. Furthermore, corona discharge may also occur between the plurality of discharge electrode plates 11 to 15 of the first filter unit 2 and the second filter unit 4.

The dust particles in air may be first electrically charged while passing through the electric charging unit 1. The electrically charged dust particles may pass through passages P1 to P4 between the plurality of discharge electrode plates 11 to 15, and then may flow between the plurality of discharge electrode plates 11 to 15 and the second filter unit 4. The dust particles, which have been first electrically charged at the electric charging unit 1', may be secondly electrically charged while passing between the plurality of discharge electrode plates 11 to 15 of the first filter unit 2 and the second filter unit 4. The electrically charged dust particles may be collected at the second filter unit 4.

FIG. 13 is a view showing an embodiment of an air conditioner having the electric dust collecting device according to the present invention.

The air conditioner having the electric dust collecting device may include a blower 80 for blowing air to the electric dust collecting device 1. The blower 80 may cause indoor air to flow through the electric charging unit 1, 1', the first filter unit 2 and the second filter unit 4, 4' in this order. Upon activation of the blower 80, indoor air may flow toward the electric charging unit 1, 1', and then may sequentially pass through the first filter unit 2 and the second filter unit 4, 4'.

The air conditioner may include an air inlet I through which indoor air is inhaled, and an air outlet O through which air conditioned in the air conditioner is discharged to an indoor space.

When the air conditioner is embodied as an air cleaning device for cleaning air, the air cleaning device may include the electric dust collecting device and the blower 80. When the air conditioner is embodied as an air cleaning and cooling apparatus for performing both cleaning of air and cooling of an indoor space, the air cleaning and cooling apparatus may further include a heat exchanger 90 for exchanging heat between refrigerant and air in addition to the electric dust collecting device 1 and the blower 80. When the air conditioner is embodied as an air cleaning and heating apparatus for performing both cleaning of air and heating of an indoor space, the air cleaning and heating apparatus may further include at least one of the heat exchanger 90 for exchanging heat between refrigerant and air and a heater (not shown) for generating heat by electric power to heat air in addition to the electric dust collecting device 1 and the blower 80.

The air conditioner may further include a filter guide 100 having the air inlet I formed thereat and on which the electric dust collecting device 1 is detachably mounted.

The filter guide 100 may be provided with the first filter case attachment to which the first filter case 20 of the first and second embodiments of the electric dust collecting device according to the present invention is detachably attached. The first filter case 20 may be mounted on the filter guide 100 and may be removed from the filter guide 100.

The filter guide 100 may be provided with the second filter case attachment to which the second filter case 50 of the second embodiment of the electric dust collecting device according to the present invention is detachably attached. The second filter case 50 may be mounted on the filter guide 100 and may be removed from the filter guide 100.

The filter guide 100 may be provided with the third filter case attachment to which the third filter case 70 of the third embodiment of the electric dust collecting device according to the present invention is detachably attached. The third filter case 70 may be mounted on the filter guide 100 and may be removed from the filter guide 100.

The second filter unit 4 of the first embodiment of the present invention may be mounted on and separated from the filter guide 100 of the air conditioner instead of being detachably mounted on the first filter case 20.

The air inlet I, the electric charging unit 1, 1', the first filter unit 2, the second filter unit 4, the blower 80 and the air outlet O may be installed at the air conditioner in this order in the air flow direction A. The air conditioner may inhale outside air to clean the air and then may discharge the cleaned air to an indoor space.

The electric charging unit 1, 1', the air inlet I, the first filter unit 2, the second filter unit 4, the blower 80 and the air outlet O may be installed at the air conditioner in this order in the air flow direction A. The air conditioner may inhale outside air to clean the air and then may discharge the cleaned air to an indoor space.

The air conditioner may further include a pre-filter 110 which is disposed between the electric charging unit 1 and the first filter unit 2 in the air flow direction A. In this case, the air conditioner may be constructed such that the electric charging unit 1, 1', the air inlet I, the pre-filter 110, the first filter unit 2, the second filter unit 4, the blower 80 and the air outlet O are disposed in this order.

The air conditioner may further include a pre-filter (not shown) which is disposed before the electric charging unit 1, 1' in the air flow direction A.

Upon activation of the blower 80 of the air conditioner, the high voltage generator 6 may be turned on and the electric dust collecting device 1 may electrically charge dust in air blown by the blower 80, thus collecting the dust.

Various embodiments have been described in the best mode for carrying out the invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An electric dust collecting device comprising:
    an electric charging unit for generating ions by ionizing molecules in the air by high voltage generated by a high voltage generator and electrically charging dust in air;
    a first filter unit including a plurality of discharge electrode plates to which a high voltage is applied and spaced apart from each other to define passages therebetween through which dust electrically charged by the electric charging unit passes; and
    a second filter unit disposed downstream of the plurality of discharge electrode plates in an air flow direction and connected to a ground to cause corona discharge between the plurality of discharge electrode plates and the second filter unit and to collect electrically charged dust,
    wherein the electric charging unit comprises at least one ion generator for generating ions at a position before the plurality of discharge electrode plates in the air flow direction,
    wherein the at least one ion generator includes a pair of ion generators spaced apart from each other by a smaller spacing than that between the opposite outermost discharge electrode plates of the plurality of discharge electrode plates.

2. The electric dust collecting device according to claim 1, wherein the plurality of discharge electrode plates are disposed downstream of the electric charging unit in the air flow direction.

3. The electric dust collecting device according to claim 1, wherein the plurality of discharge electrode plates have rear ends disposed downstream in the air flow direction and facing the second filter unit.

4. The electric dust collecting device according to claim 1, wherein the first filter unit includes passages defined between the plurality of discharge electrode plates.

5. The electric dust collecting device according to claim 1, wherein the at least one ion generator is elongated in a direction parallel to a spacing direction of the plurality of electrode plates.

6. The electric dust collecting device according to claim 1, wherein the second filter unit is constituted by a metal mesh connected to the ground.

7. The electric dust collecting device according to claim 1, wherein the second filter unit includes a plurality of earth electrode plates spaced apart from each other.

8. The electric dust collecting device according to claim 7, wherein the plurality of earth electrode plates have a smaller first spacing therebetween than a second spacing between the plurality of discharge electrode plates, and include a larger number of earth electrode plates than that of the plurality of discharge electrode plates.

9. The electric dust collecting device according to claim 6, further comprising:
 a first earth line connected to the second filter unit;
 a first earth terminal connected to the first earth line;
 a second earth line connected to the ground; and
 a second earth terminal connected to the second earth line and releasably connected to the first earth terminal.

10. An air conditioner comprising:
 an electric dust collecting device for electrically charging dust in air and collecting the charged dust; and
 a blower for blowing air toward the electric dust collecting device,
 wherein the electric dust collecting device comprises:
  an electric charging unit for generating ions by ionizing molecules in the air by high voltage generated by a high voltage generator and electrically charging dust in air;
  a first filter unit including a plurality of discharge electrode plates to which a high voltage is applied and spaced apart from each other to define passages therebetween through which dust electrically charged by the electric charging unit passes; and
  a second filter unit disposed downstream of the plurality of discharge electrode plates in an air flow direction and connected to a ground to cause corona discharge between the plurality of discharge electrode plates and the second filter unit and to collect electrically charged dust,
 wherein the electric charging unit includes at least one ion generator for generating ions at a position before the plurality of discharge electrode plates in the air flow direction,
 wherein the at least one ion generator includes a pair of ion generators spaced apart from each other by a smaller spacing than that between the opposite outermost discharge electrode plates of the plurality of discharge electrode plates.

11. The air conditioner according to claim 10, wherein the plurality of discharge electrode plates are disposed downstream of the electric charging unit in the air flow direction.

12. The air conditioner according to claim 10, wherein the second filter unit is constituted by a metal mesh connected to the ground.

13. The air conditioner according to claim 10, wherein the second filter unit includes a plurality of earth electrode plates spaced apart from each other.

14. The air conditioner according to claim 13, wherein the plurality of earth electrode plates have a smaller first spacing therebetween than a second spacing between the plurality of discharge electrode plates, and include a larger number of earth electrode plates than that of the plurality of discharge electrode plates.

15. The air conditioner according to claim 12, further comprising:
 a first earth line connected to the second filter unit;
 a first earth terminal connected to the first earth line;
 a second earth line connected to the ground; and
 a second earth terminal connected to the second earth line and releasably connected to the first earth terminal.

\* \* \* \* \*